(12) United States Patent
Ozawa

(10) Patent No.: US 8,958,015 B2
(45) Date of Patent: Feb. 17, 2015

(54) COLOR VIDEO PROJECTOR CONTROLLED BY AMBIENT LIGHT DETECTION AND METHOD THEREFOR

(71) Applicant: Seiko Epson Corporation, Tokyo (JP)

(72) Inventor: Takashi Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/307,784

(22) Filed: Jun. 18, 2014

(65) Prior Publication Data
US 2015/0009342 A1  Jan. 8, 2015

(30) Foreign Application Priority Data

Jul. 3, 2013  (JP) .................................. 2013-139528
Mar. 20, 2014  (JP) .................................. 2014-057672

(51) Int. Cl.
H04N 5/57 (2006.01)
H04N 5/58 (2006.01)
H04N 5/50 (2006.01)
H04N 3/22 (2006.01)
H04N 17/00 (2006.01)

(52) U.S. Cl.
CPC .................................. H04N 17/004 (2013.01)
USPC ............ 348/603; 348/602; 348/569; 348/745

(58) Field of Classification Search
USPC ................. 348/602, 603, 655, 656, 569, 745; 345/207, 589; 315/149
See application file for complete search history.

(56) References Cited

U.S. PATENT DOCUMENTS

| 4,742,387 A * | 5/1988 | Oshima .......................... 348/658 |
| 2003/0231260 A1* | 12/2003 | Pate et al. ...................... 348/744 |
| 2005/0141069 A1* | 6/2005 | Wood et al. .................... 359/196 |
| 2007/0052733 A1 | 3/2007 | Hirabayashi et al. |
| 2007/0139562 A1* | 6/2007 | Miyake .......................... 348/603 |
| 2008/0043031 A1* | 2/2008 | Jagmag ......................... 345/581 |
| 2009/0146982 A1* | 6/2009 | Thielman et al. ............. 345/207 |
| 2011/0205397 A1* | 8/2011 | Hahn et al. .................. 348/231.6 |
| 2011/0234919 A1* | 9/2011 | Sprague et al. ............... 348/744 |
| 2012/0106922 A1* | 5/2012 | Tsukagoshi .................... 386/230 |
| 2013/0061258 A1* | 3/2013 | Takaya et al. .................... 725/10 |
| 2013/0235234 A1* | 9/2013 | Cucci et al. .............. 348/231.99 |

FOREIGN PATENT DOCUMENTS

| JP | A-2007-74347 | 3/2007 |
| JP | A-2009-118380 | 5/2009 |
| JP | A-2010-243870 | 10/2010 |

* cited by examiner

*Primary Examiner* — Victor Kostak
(74) *Attorney, Agent, or Firm* — Oliff PLC

(57) ABSTRACT

A display apparatus capable of notifying a user that a color mode that does not correspond to illuminance in an environment around the display apparatus is set is provided. When the display apparatus is powered on, an illuminance measurement section measures illuminance in an environment around the display apparatus, and when a set color mode does not correspond to the measured illuminance, a notification image is projected to notify that the color mode should be changed.

6 Claims, 5 Drawing Sheets

SET COLOR MODE DOES NOT CORRESPONDS
TO CURRENT ILLUMINANCE

CURRENT COLOR MODE : DYNAMIC
 COLOR MODE THAT CORRESPONDS TO
 CURRENT ILLUMINANCE
 → LIVING ROOM
    PHOTOGRAPH

TO CHANGE COLOR MODE :
USE ↑↓ TO SELECT AND FINALIZE COLOR MODE,
REMAIN UNCHANGED : ESC

| ILLUMINANCE RANGE (Lux) | DYNAMIC | PRESENTATION | GAME | LIVING ROOM | PHOTOGRAPH | THEATER |
|---|---|---|---|---|---|---|
| 501~ | Yes | No | No | No | No | No |
| 301~500 | Yes | Yes | Yes | No | No | No |
| 151~300 | No | Yes | Yes | Yes | No | No |
| 51~150 | No | No | Yes | Yes | Yes | No |
| 6~50 | No | No | No | No | Yes | Yes |
| 0~5 | No | No | No | No | No | Yes |

FIG. 5

COLOR VIDEO PROJECTOR CONTROLLED BY AMBIENT LIGHT DETECTION AND METHOD THEREFOR

CROSS-REFERENCE TO RELATED APPLICATION

The entire disclosure of Japanese Patent Application No. 2013-139528, filed Jul. 3, 2013 and Japanese Patent Application No. 2014-057672, filed Mar. 20, 2014 are expressly incorporated by reference herein.

BACKGROUND

1. Technical Field

The present invention relates to a display apparatus and a method for controlling the display apparatus.

2. Related Art

In a projector of related art that is a display apparatus that projects an image on a screen or any other projection surface, a color mode function can be provided to set a plurality of image quality adjustment values in accordance with the type of the image and illuminance in an environment around the projector. For example, the color mode function provides a theater mode used when a movie is viewed in a dim room and a dynamic mode used when a projected image is made brighter in a bright room. However, when the theater mode is set in a bright room, a projected image is dim relative to the bright room and it is hence undesirably difficult to view the image in some cases. On the other hand, when the dynamic mode is set in a dim room, a projected image is too bright and hence too glaring in some cases. To address the problems described above, JP-A-2010-243870 discloses a projector that sets a color mode that corresponds to the illuminance in an environment around the projector. According to the projector, the color mode is automatically set in accordance with illuminance set in advance.

In the projector disclosed in JP-A-2010-243870, however, the color mode may not necessarily be set as desired by a user depending on the type of a projected image, the illuminance in a room where the projector is used, and other viewing environmental factors. Further, since the color mode is unintentionally switched to another when the illuminance changes, the user may be puzzled in some cases.

SUMMARY

An advantage of some aspects of the invention is to solve at least a part of the problems described above, and the invention can be implemented as the following aspects or application examples.

A display apparatus according to an application example is a display apparatus that displays an image according to image information based on an inputted image signal and includes an illuminance measurement section that measures illuminance in an environment around the display apparatus, a color mode setting section that provides a plurality of color modes for setting adjustment of image quality of the image and sets the image to be displayed in accordance with one of the color modes, a storage section that stores a color mode table that defines the color modes in such a way that the color modes correspond to the measured illuminance, and a control section that issues notification in a case where the color mode set when the display apparatus is powered on differs from the color mode that corresponds to the illuminance measured by the illuminance measurement section when the display apparatus is powered on.

When the display apparatus is powered on and it is determined that a color mode that does not correspond to the illuminance in the environment around the display apparatus is set, notification can be made and the notification can prompt a user to change the color mode to a color mode that corresponds to the illuminance.

When a change in the illuminance during the operation of the display apparatus is detected, and it is determined that the color mode does not correspond to the illuminance, notification can be made. Therefore, when the environment in which the display apparatus is used changes, notification can be made to notify that the current color mode is not suitable for the illuminance and prompt the user to change the color mode to a color mode that corresponds to the illuminance.

When the color mode of the display apparatus is changed, and it is determined that the new color mode does not correspond to the current illuminance, notification can be made and the notification can prompt the user to change the color mode to a color mode that corresponds to the illuminance.

The display apparatus may display a list of color modes that correspond to the current illuminance, and the user can select a color mode that corresponds to the illuminance.

The display apparatus may be a kind of a projector that further includes an image projection section that modulates light emitted from a light source in accordance with the image information based on the inputted image signal and displays an image by projecting the modulated light on a projection surface.

BRIEF DESCRIPTION OF THE DRAWINGS

The invention will be described with reference to the accompanying drawings, wherein like numbers reference like elements.

FIG. 2 is a flowchart showing the action performed when the projector is powered on.

FIG. 4 shows an example of an image that notifies that a color mode that does not correspond to the illuminance in the environment around the projector is set.

FIG. 5 shows an example of contents saved in a color mode table.

DESCRIPTION OF EXEMPLARY EMBODIMENTS

An embodiment of the invention will be described below with reference to the drawings, but the following embodiment does not limit the invention defined in the appended claims, and all combinations of features of the embodiment are not necessarily essential to achieve the advantage of the invention.

Embodiment

Figure 1:
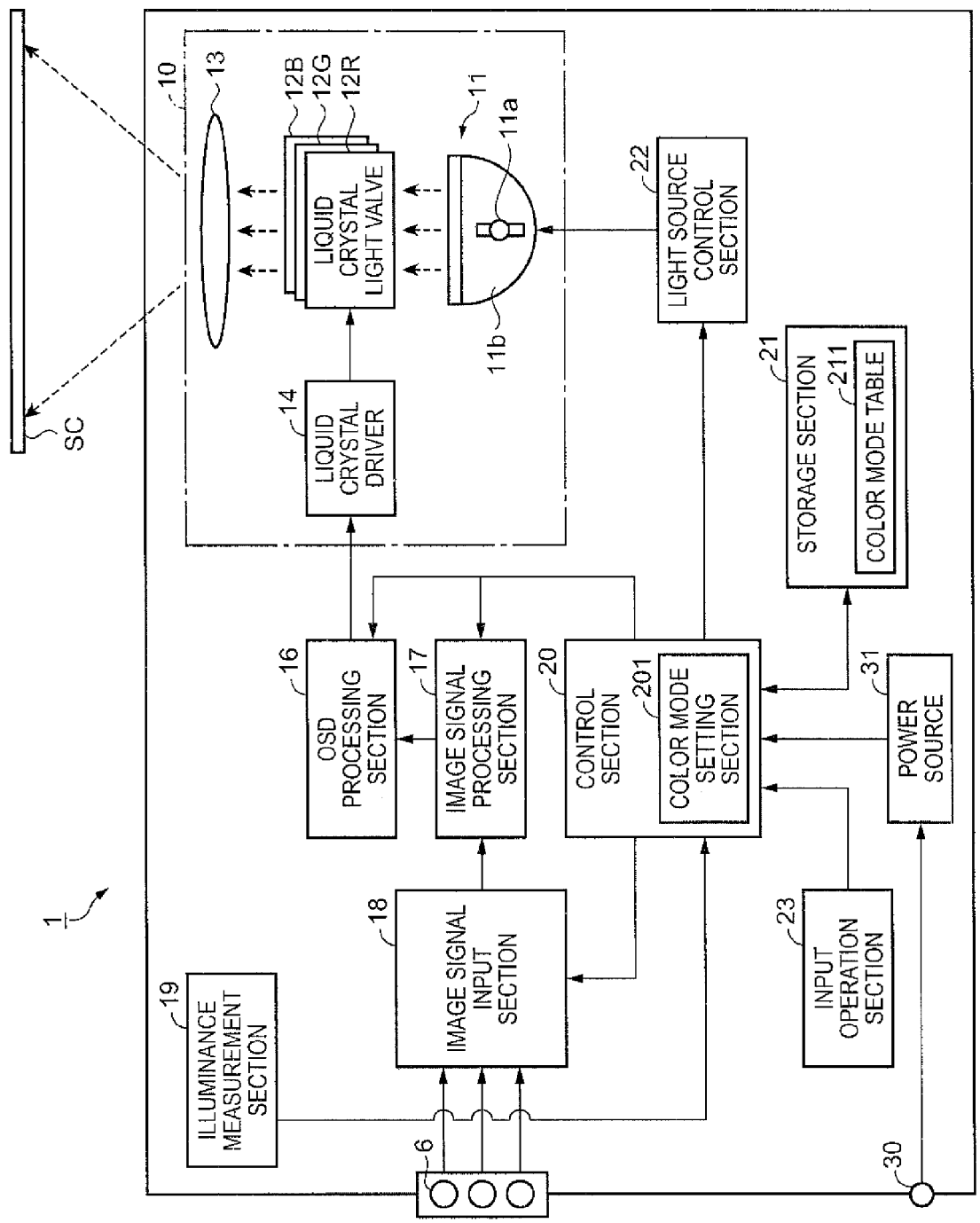
FIG. 1 is a block diagram showing a circuit configuration of a projector according to an embodiment.

FIG. 1 is a block diagram showing a circuit configuration of a projector 1 as a display apparatus. The projector 1 is formed, for example, of image input terminals 6, an image projection section 10, an OSD processing section 16, an image signal processing section 17, an image signal input section 18, an illuminance measurement section 19, a control section 20, a storage section 21, a light source control section 22, an input operation section 23, a power source terminal 30, and a power source 31, as shown in FIG. 1, and the components described above are disposed inside an enclosure (not shown) or on an outer surface thereof.

The image projection section 10 includes a light source 11, three liquid crystal light valves 12R, 12G, and 12B as light modulators, a projection lens 13 as a projection system, and a liquid crystal driver 14. The image projection section 10, in which the liquid crystal light valves 12R, 12G, and 12B modulate light emitted from the light source 11 and the projection lens 13 projects an image formed by the modulated light, displays a projected image on a screen SC or any other projection surface.

The light source 11 includes a discharge-type light source lamp 11a, which is formed, for example, of an ultrahigh-pressure mercury lamp or a metal halide lamp, and a reflector 11b, which reflects light emitted from the light source lamp 11a toward the liquid crystal light valves 12R, 12G, and 12B.

The light outputted from the light source 11 is converted by an optical integration system (not shown) into light having a substantially uniform luminance distribution, and the resultant light is separated by a color separation system (not shown) into the following color light components: red (R), green (G), and blue (B), which are the three primary colors of light. The R, G, and B color light components are then incident on the corresponding liquid crystal light valves 12R, 12G, and 12B, respectively.

Each of the liquid crystal light valves 12R, 12G, and 12B is formed, for example, of a liquid crystal panel having a liquid crystal material sealed between a pair of transparent substrates. Each of the liquid crystal light valves 12R, 12G, and 12B has a plurality of pixels (not shown) arranged in a matrix, and a drive voltage is applicable to the liquid crystal material on a pixel basis.

When the liquid crystal driver 14 applies a drive voltage according to inputted image data to each of the pixels, the optical transmittance of the pixel is set in accordance with the image information. As a result, the light outputted from the light source 11 is modulated when passing through the liquid crystal light valves 12R, 12G, and 12B, and image light according to the image information is formed on a color light component basis.

The thus formed color image light fluxes are combined with one another by a light combining system (not shown) on a pixel basis into color image light, which is then enlarged and projected through the projection lens 13 on the screen SC or any other surface to form a projected image.

In the present embodiment, the projector 1, which performs projection by using the light source lamp 11a as part of the light source, is presented by way of example, and the invention is also applicable to a projector that performs projection by using an LED (light emitting diode) light source, a laser light source, or any other solid-state light source as part of the light source.

In the present embodiment, the image projection section 10 includes a projection system based on a transmissive liquid crystal technology using the three liquid crystal light valves 12R, 12G, and 12B by way of example but may instead employ light modulators based on a reflective liquid crystal technology, a micromirror device technology (light switch display technology), or any other display technology.

The control section 20 includes a CPU (central processing unit) and a RAM (random access memory) used to temporarily store a variety of data and other pieces of information (neither CPU nor RAM is shown) and operates in accordance with a control program (not shown) stored in the storage section 21 to oversee and control the action of the projector 1.

That is, the control section 20 along with the storage section 21 functions as a computer. The control section 20 further includes a color mode setting section 201. The color mode setting section 201 selects one of a plurality of color modes for setting adjustment of image quality of an image projected by the image projection section 10 and sets the selected color mode as a color mode to be used. The color mode used herein is an item used to adjust the image quality in accordance with the type of the image, a viewing environment, and other factors and includes the following modes: a "dynamic" color mode suitable for a situation in which an image is viewed in a bright environment and high priority is placed on the grayscale representation of a dim portion of the image; a "living room" color mode suitable for a situation in which an image is viewed in a half-light environment; a "theater" color mode suitable for a situation in which a movie is viewed in a dim environment; a "photograph" color mode suitable for a situation in which a photograph or a still image is projected in a bright environment; a "presentation" color mode suitable for a situation in which a presentation is made by using a color material in a bright environment; a "game" color mode suitable for a situation in which a game is played in a bright environment; and other modes.

The storage section 21 is formed of a flash memory, an FeRAM (ferroelectric RAM), or any other rewritable non-volatile memory. The storage section 21 stores, for example, the control program for controlling the action of the projector 1 and a variety of setting data that define, for example, action conditions under which the projector 1 operates. In the present embodiment, the storage section 21 saves a color mode table 211, in which the color modes are defined in correspondence with ranges of illuminance in an environment around the projector 1. The color mode table 211 specifically saves definitions that define whether or not each of the color modes corresponds to measured illuminance ranges.

FIG. 5 shows an example of contents saved in the color mode table 211. As shown in FIG. 5, whether or not the color modes correspond to the measured illuminance ranges is defined in the form of Yes or No. For example, when measured illuminance ranges from 301 to 500 Lux, the dynamic, presentation, and game color modes correspond to the range of illuminance, and when measured illuminance ranges from 0 to 5 Lux, only the theater mode corresponds to the range of illuminance.

Referring back to FIG. 1, the input operation section 23 includes a plurality of operation keys that allow the user to issue a variety of instructions to the projector 1. The operation keys provided on the input operation section 23 include a power key for alternately switching the state of the power source between on and off, an input switch key for switching one of the plurality of image input terminals 6 to another through which an image signal is inputted to the image signal input section 18, a menu key for superimposing and displaying a setting menu the allows the user to make a variety of settings, a cursor key that allows the user to select a setting item in the menu, a finalizing key for finalizing a variety of settings, an escape key that forces the current screen under setting operation to return to the previous screen, and a color mode key that allows the user to select one of the color modes.

When the user operates any of the variety of operation keys on the input operation section 23, the input operation section 23 outputs an operation signal according to the user's operation to the control section 20. The input operation section 23 may instead be formed of a remote control signal receiver (not shown) and a remotely operable remote control (not shown). In this case, the remote control sends, for example, an infrared operation signal according to user's operation, and the remote control signal receiver receives the operation signal and transmits it as control information to the control section 20.

The illuminance measurement section 19 is formed, for example, of a photosensor (not shown) and measures luminance in an environment around the projector 1 in response to an instruction from the control section 20. The illuminance measurement section 19 then notifies the control section 20 of the measured illuminance.

The light source control section 22 controls supply and termination of electric power supplied to the light source 11 to turn on and off the light source 11 in response to an instruction from the control section 20.

The image signal input section 18 receives image information as an input from a video reproducing apparatus, a personal computer, or any other external image output apparatus via a cable, a communication device, or any other component (not shown) through one of the plurality of image input terminals 6. The image signal input section 18 outputs the inputted image information to the image signal processing section 17 in response to an instruction from the control section 20. The image signal input section 18 may instead include a receiver based, for example, on wireless communication or optical communication and receive an image signal as an input wirelessly from an external apparatus.

The image signal processing section 17 converts the image information inputted from the image signal input section 18 into image data representing the grayscale at each of the pixels in each of the liquid crystal light valves 12R, 12G, and 12B in response to an instruction from the control section 20. The converted image information is formed of portions corresponding to red (R), green (G), and blue (B), and each of the portions is formed of a plurality of pixel values corresponding to all pixels of the corresponding one of the liquid crystal light valves 12R, 12G, and 12B. Each of the pixel values specifies optical transmittance of the corresponding pixel and defines the intensity (grayscale) of light that passes through the pixel and exits out thereof.

The OSD processing section 16 carries out a process of superimposing a menu image, a message image, or any other OSD (on-screen display) image on a projected image and displaying the resultant image in response to an instruction from the control section 20. The OSD processing section 16 includes an OSD memory (not shown) that stores OSD image data representing figures, fonts, and other objects for forming the OSD images.

When the control section 20 issues an instruction to superimpose an OSD image and display the resultant image, the OSD processing section 16 reads necessary OSD image data from the OSD memory and combines the OSD image data with the image data inputted from the image signal processing section 17 in such a way that the OSD image is superimposed in a predetermined position of the projected image. The image data combined with the OSD image information is outputted to the liquid crystal driver 14.

When the control section 20 issues no instruction to superimpose an OSD image, the OSD processing section 16 outputs the image data inputted from the image signal processing section 17 directly to the liquid crystal driver 14.

When the liquid crystal driver 14 drives the liquid crystal light valves 12R, 12G, and 12B in accordance with the image data inputted from the OSD processing section 16, an image according to the image data is projected through the projection lens 13, and the projected image is displayed on the screen SC or any other projection surface.

The power source 31 receives electric power, such as AC 100 V, externally supplied through the power source terminal 30. The power source 31 converts the inputted electric power (AC electric power) into predetermined DC electric power and supplies the components in the projector 1 with the electric power. Further, the power source 31 can switch operation thereof in response to an instruction from the control section 20 between a state in which electric power necessary for image projection (operation electric power) is supplied to the components (power-on state) and a state in which the operation electric power is not supplied and the power source 31 waits for power-on operation (standby state).

The action of the projector 1 according to the present embodiment will next be described with reference to FIGS. 2 and 3.

Figure 2:
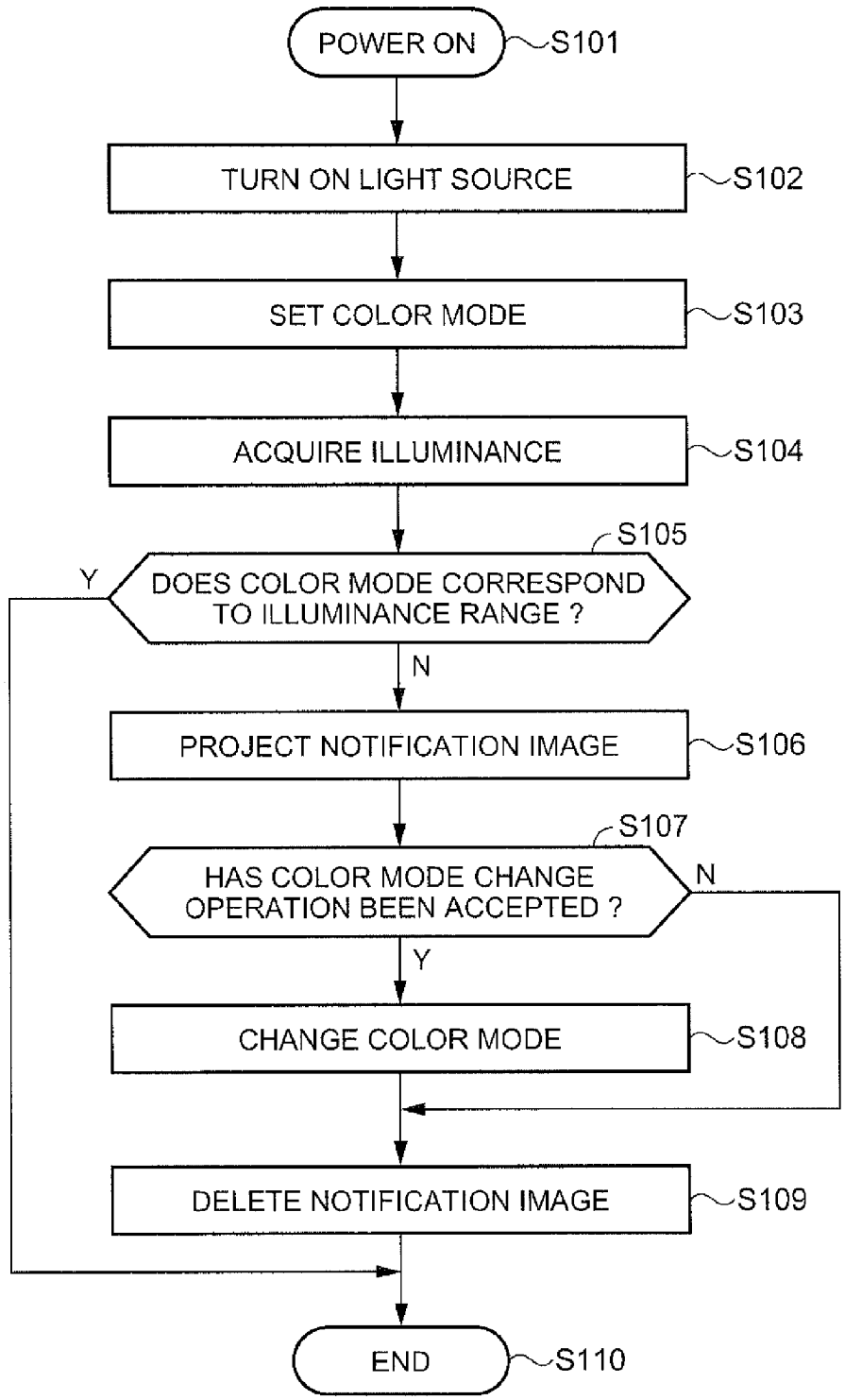
Figure 3:
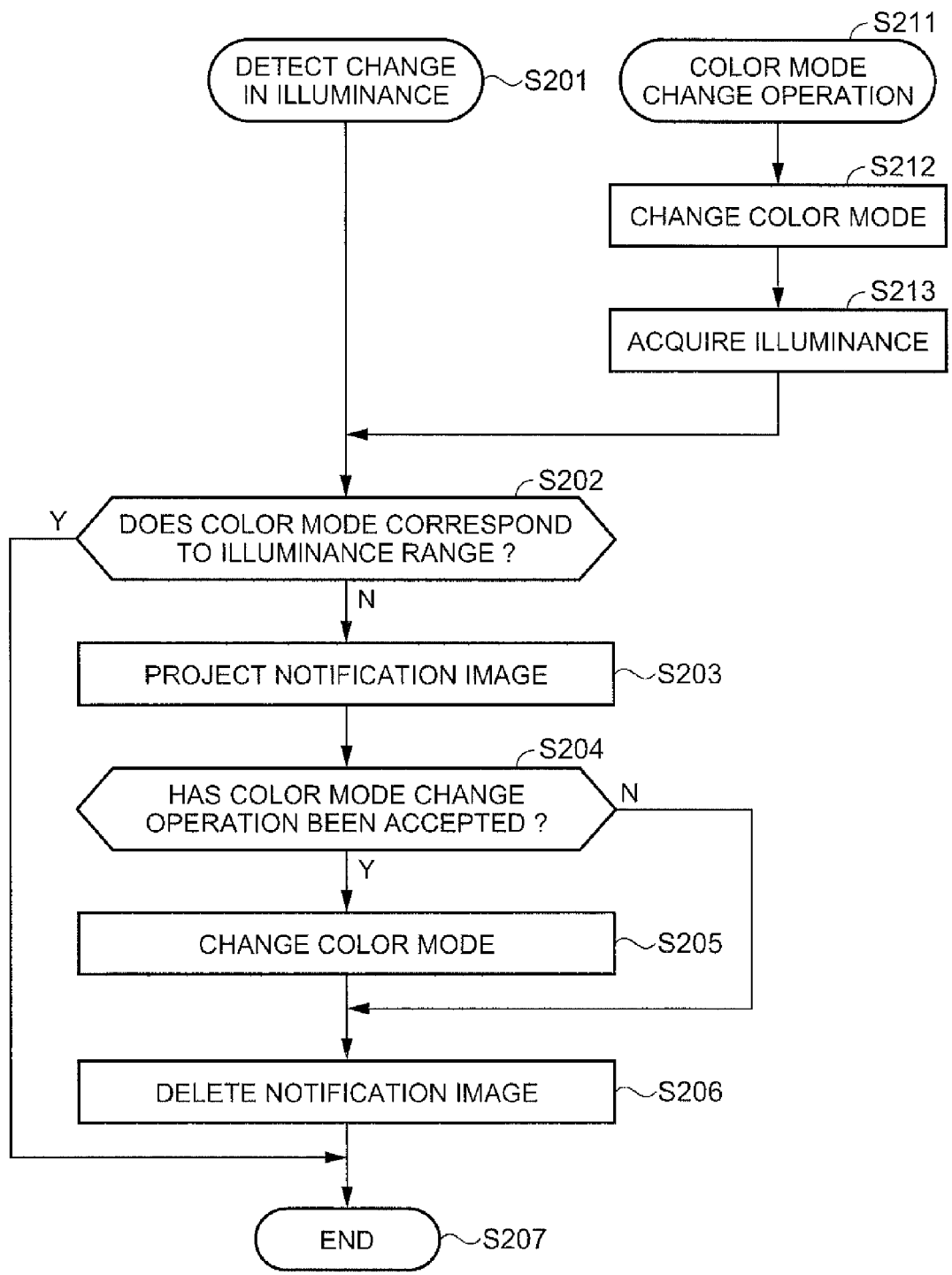
FIG. 3 is a flowchart showing the action when the projector in operation detects a change in illuminance in an environment therearound and the action when the projector in operation accepts color mode change operation.

FIG. 2 is a flowchart showing the action of the projector 1 when the projector 1 is powered on, and FIG. 3 is a flowchart showing the action of the projector 1 when the projector 1 in operation detects a change in the illuminance in the environment therearound and the action of the projector 1 when the projector 1 in operation accepts color mode change operation.

Action Performed when Projector is Powered on

When the user operates the power key on the input operation section 23 or otherwise power on the projector 1 (step S101), the control section 20 instructs the light source control section 22 to turn on the light source 11 (step S102), and the control proceeds to step S103, as shown in FIG. 2.

In step S103, the color mode setting section 201 sets an image quality adjustment value based on a currently selected color mode and provides the image projection section 10 with the thus set value, and the control proceeds to step S104. The step S103 corresponds to a color mode setting step.

In step S104, the control section 20 instructs the illuminance measurement section 19 to measure the illuminance in the environment around the projector 1 and acquires a result of the measurement, and the control proceeds to step S105. The step S104 corresponds to an illuminance measurement step.

In step S105, the control section 20 examines based on the color mode table 211 whether or not the currently set color mode corresponds to the illuminance acquired in step S104. When the currently set color mode corresponds to the illuminance (step S105: Y), the control proceeds to step S110. When the color mode does not correspond to the illuminance (step S105: N), the control proceeds to step S106. The step S105 corresponds to a determination step.

FIG. 4 shows an example of an image displayed when a color mode that does not correspond to a current illuminance range is set.

In step S106, when a color mode that does not correspond to the measured illuminance is set, the control section 20 instructs the image projection section 10 to project a notification image M1, which shows that the color mode does not correspond to the illuminance, as shown in FIG. 4.

The displayed notification image M1 shows, for example, the currently set color mode (dynamic) and a color mode that corresponds to the measured illuminance (living room or photograph), as shown in FIG. 4. The control then proceeds to step S107. The step S106 corresponds to a notification step.

In step S107, the control section 20 examines whether or not it has accepted color mode change operation in response to the notification image M1. When the control section 20 has accepted color mode change operation (step S107: Y), the control proceeds to step S108. When the control section 20 has accepted no color mode change operation (step S107: N), the control proceeds to step S109.

In step S108, the color mode setting section 201 sets an image quality adjustment value based on the color mode changed and accepted in step S107 and provides the image projection section 10 with the thus set value, and the control proceeds to step S109. The step S108 corresponds to the color mode setting step.

In step S109, the control section 20 deletes the notification image M1 and the control proceeds to step S110.

In step S110, the projector 1 starts image projection and terminates the action procedure shown in the flowchart.

Action Performed when Projector in Operation Detects Change in Illuminance

When the projector 1 is in operation, and the illuminance measurement section 19 detects a change in the illuminance in the environment around the projector 1 (step S201), the control proceeds to step S202, as shown in FIG. 3.

In step S202, the control section 20 examines whether or not the currently set color mode corresponds to the measured illuminance based on the color mode table 211. When the color mode corresponds to the illuminance (step S202: Y), the control proceeds to step S207. When the color mode does not correspond to the illuminance (step S202: N), the control proceeds to step S203. The step S202 corresponds to the determination step.

In step S203, the control section 20 instructs the image projection section 10 to project the notification image M1, which shows that the color mode does not correspond to the illuminance. The displayed notification image M1 shows, for example, the currently set color mode and a color mode that corresponds to the measured illuminance, as shown in FIG. 4. The control then proceeds to step S204. The step S203 corresponds to the notification step.

In step S204, the control section 20 examines whether or not it has accepted color mode change operation in response to the notification image M1. When the control section 20 has accepted color mode change operation (step S204: Y), the control proceeds to step S205. When the control section 20 has accepted no color mode change operation (step S204: N), the control proceeds to step S206.

In step S205, the color mode setting section 201 sets an image quality adjustment value based on the color mode changed and accepted in step S204 and provides the image projection section 10 with the thus set value, and the control proceeds to step S206. The step S205 corresponds to the color mode setting step.

In step S206, the control section 20 deletes the notification image M1 and the control proceeds to step S207.

In step S207, the action procedure shown in the flowchart is terminated.

Action Performed when Projector in Operation Accepts Color Mode Change Operation When the projector 1 in operation accepts color mode change operation, for example, from the user who operates the color mode key on the input operation section 23 (step S211), the color mode setting section 201 changes the color mode, sets an image quality adjustment value based on the newly set color mode, and provides the image projection section 10 with the thus set value (step S212), and the control proceeds to step S213, as shown in FIG. 3. The step S212 corresponds to the color mode setting step.

In step S213, the control section 20 instructs the illuminance measurement section 19 to measure the illuminance in the environment around the projector 1, and the control proceeds to step S202. The action after step S202 has been already described above and will therefore be omitted.

The embodiment described above provides the following advantageous effects.

According to the projector 1 of the present embodiment, when the projector 1 is powered on and it is determined based on the color mode table 211 that a color mode that does not correspond to the illuminance in the environment around the projector 1 is set, the notification image M1 that notifies that the color mode should be changed can prompt the user to change the color mode to a color mode that corresponds to the illuminance.

Further, when the illuminance measurement section 19 detects a change in the illuminance during the operation of the projector 1, and it is determined based on the color mode table 211 that the color mode does not correspond to the illuminance, notification is made. Therefore, when the environment in which the projector 1 is used changes, notification can be made to notify that the current color mode is not suitable for the illuminance and prompt the user to change the color mode to a color mode that corresponds to the illuminance.

Further, when the color mode of the projector 1 is changed, and it is determined based on the color mode table 211 that the new color mode does not correspond to the current illuminance, notification is made and the notification can prompt the user to change the color mode to a color mode that corresponds to the illuminance.

Further, when it is determined based on the color mode table 211 that a color mode that does not correspond to the current illuminance is selected, a list of color modes that correspond to the current illuminance is displayed, and the list allows the user to select a color mode that corresponds to the illuminance.

The embodiment described above may be changed as follows.

Variation 1

In the embodiment described above, the projector 1 may be so configured that the user can define a color mode that corresponds to certain illuminance and change the color mode to the color mode defined by the user. In this case, the thus defined color mode that corresponds to the certain illuminance can be set based on user's preference and the situation in which the projector is used.

Variation 2

In the embodiment described above, the projector may further include a distance measurement section that measures the distance to the projection surface and may determine whether or not the color mode corresponds to the illuminance in the environment around the projector in consideration of the distance from the projector to the projection surface. For example, the distance from the projector to the projection surface is divided into three ranges, and a table of the color modes that correspond to the illuminance ranges shown in FIG. 5 is prepared and used for each of the distance ranges. Specifically, since a shorter distance from the projector to the projection surface increases the brightness of a projected image, a color mode suitable for a bright environment is used. On the other hand, since a longer distance from the projector to the projection surface lowers the brightness of a projected image, a color mode suitable for a dim environment is used. That is, a suitable color mode can be selected in accordance with the distance to the projection surface in the same illuminance environment.

Variation 3

In the embodiment described above, an aspect in which the invention is applied to the projector 1, which projects an image, is presented by way of example, but the technical idea of the invention is not necessarily applied to the projector 1 described above. For example, the invention is also applicable to a display apparatus that displays an image according to image information based on an inputted image signal. That is, such a display apparatus can solve the following problems: A setting desired by the user is not necessarily provided based on the type of a displayed image, the illuminance in a room where the display apparatus is used, and other viewing environmental factors; and a change in the illuminance unintentionally switches the color mode to another, which puzzles the user.

It is contemplated that the display apparatus described above is a cathode ray tube (CRT), a liquid crystal display, a plasma display, an organic EL display, and a head-mounted display.

What is claimed is:

1. A display apparatus that displays an image according to image information based on an inputted image signal, the display apparatus comprising:
    an illuminance measurement section that measures illuminance in an environment around the display apparatus;
    a color mode setting section that provides a plurality of color modes for setting adjustment of image quality of the image and sets the image to be displayed in accordance with one of the color modes;
    a storage section that stores a color mode table that defines the color modes in such a way that the color modes correspond to the measured illuminance; and
    a control section that issues notification when the color mode set when the display apparatus is powered on differs from the color mode that corresponds to the illuminance measured by the illuminance measurement section when the display apparatus is powered on.

2. The display apparatus according to claim 1,
    wherein when the control section detects a change in the illuminance measured by the illuminance measurement section, and the color mode set by the color mode setting section differs from the color mode that corresponds to the illuminance having changed, the control section issues notification.

3. The display apparatus according to claim 1,
    wherein when the color mode setting section changes the color mode, and the changed color mode does not correspond to the illuminance measured by the illuminance measurement section, the control section issues notification.

4. The display apparatus according to claim 1,
    wherein the control section displays a list of the color modes that correspond to the illuminance based on the color mode table.

5. The display apparatus according to claim 1,
    further comprising an image projection section that modulates light emitted from a light source in accordance with the image information based on the inputted image signal and displays an image by projecting the modulated light on a projection surface.

6. A method for controlling a display apparatus that displays an image according to image information based on an inputted image signal, the method comprising:
    measuring illuminance in an environment around the display apparatus;
    setting the image to be displayed in accordance with one of a plurality of color modes for setting adjustment of image quality of the image;
    determining whether or not one of the color modes that corresponds to the measured illuminance is set; and
    issuing notification when it is determined in the determining that one of the color modes that corresponds to the measured illuminance is not set when the display apparatus is powered on.

* * * * *